United States Patent
McLaughlin et al.

(10) Patent No.: US 9,224,519 B2
(45) Date of Patent: Dec. 29, 2015

(54) HOLDOUT DEVICES AND COVER ASSEMBLIES AND METHODS INCORPORATING THE SAME

(71) Applicant: Tyco Electronics Corporation, Berwyn, PA (US)

(72) Inventors: Timothy J. McLaughlin, Fuquay-Varina, NC (US); Matthew Spalding, Cornellius, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 228 days.

(21) Appl. No.: 13/714,166

(22) Filed: Dec. 13, 2012

(65) Prior Publication Data
US 2014/0166340 A1    Jun. 19, 2014

(51) Int. Cl.
| | | |
|---|---|---|
| H01R 4/72 | (2006.01) | |
| H01B 3/00 | (2006.01) | |
| H01B 13/22 | (2006.01) | |
| H02G 15/18 | (2006.01) | |

(52) U.S. Cl.
CPC .............. *H01B 3/008* (2013.01); *H01B 13/224* (2013.01); *H01R 4/72* (2013.01); *H02G 15/1826* (2013.01); *Y10T 29/49227* (2015.01); *Y10T 29/53126* (2015.01)

(58) Field of Classification Search
CPC ....................................................... H01B 3/008
USPC ....................................................... 174/126.2
See application file for complete search history.

(56) References Cited

U.S. PATENT DOCUMENTS

| | | | |
|---|---|---|---|
| 3,357,457 A | | 12/1967 | Myer |
| 3,824,331 A | * | 7/1974 | Mixon, Jr. ............. F16L 21/005 174/135 |
| 4,233,731 A | | 11/1980 | Clabburn et al. |

(Continued)

FOREIGN PATENT DOCUMENTS

| | | |
|---|---|---|
| EP | 0 399 263 A2 | 11/1990 |
| EP | 0 399 263 A3 | 11/1990 |

(Continued)

OTHER PUBLICATIONS

International Search Report and the Written Opinion of the International Searching Authority corresponding to International Application No. PCT/US2013/074394; Mailing Date: Mar. 21, 2014; 11 pages.

(Continued)

*Primary Examiner* — William H Mayo, III
*Assistant Examiner* — Krystal Robinson
(74) *Attorney, Agent, or Firm* — Myers Bigel Sibley & Sajovec, PA

(57) ABSTRACT

A cover assembly for covering an elongate substrate includes a resilient, elastically expandable sleeve member and a holdout device. The sleeve member defines an axially extending inner sleeve passage. The holdout device includes a generally tubular core mounted in the inner sleeve passage. The core defines axially opposed end openings and a core passage extending therebetween to receive the elongate substrate. The core retains the sleeve member in a radially expanded state and can be withdrawn from the sleeve member to release the sleeve member to radially contract onto the elongate substrate. The holdout device is configured such that, after removal of the sleeve member from the core, the core can be laterally removed from the elongate substrate.

9 Claims, 7 Drawing Sheets

(56) References Cited

U.S. PATENT DOCUMENTS

| | | | |
|---|---|---|---|
| 4,462,651 | A | 7/1984 | McGaffigan |
| 5,030,487 | A | 7/1991 | Rosenzweig |
| 5,098,752 | A * | 3/1992 | Chang ................ B29C 31/002 156/85 |
| 5,280,136 | A | 1/1994 | Yaworski et al. |
| 5,380,224 | A | 1/1995 | DiCicco |
| 5,406,871 | A | 4/1995 | Lambert, Jr. |
| 5,495,650 | A | 3/1996 | Crepel et al. |
| 5,670,223 | A | 9/1997 | Sadlo et al. |
| 5,753,861 | A | 5/1998 | Hansen et al. |
| 5,925,427 | A | 7/1999 | Sadlo et al. |
| 5,944,929 | A | 8/1999 | Vallauri et al. |
| 6,245,999 | B1 * | 6/2001 | Costigan et al. ............ 174/74 A |
| 6,444,913 | B1 | 9/2002 | Kao |
| 6,762,364 | B2 | 7/2004 | Hofmann et al. |
| 7,265,293 | B2 | 9/2007 | Kamel et al. |
| 2010/0025076 | A1 * | 2/2010 | Pearce ................ H02G 3/0481 174/135 |
| 2011/0254197 | A1 * | 10/2011 | Verner ................ B29C 61/065 264/249 |

FOREIGN PATENT DOCUMENTS

| | | |
|---|---|---|
| EP | 0 750 381 A1 | 12/1996 |
| EP | 0 767 523 A3 | 4/1997 |
| WO | WO 91/16564 A1 | 10/1991 |
| WO | WO 98/40941 A1 | 9/1998 |
| WO | WO 02/092328 A1 | 11/2002 |

OTHER PUBLICATIONS

"MOD-3-TFT, MOD 3Z, 3C, 3D Cold-applied, high-voltage termination modification kit for 3/C shielded and non-shielded power cables" Tyco Electronics, PII 55410, Rev AD, PCN F40796-000, Effective Date: Aug. 4, 2008 (6 pages).

"TFT-150E 15kV Cold Applied Termination System for Jacketed and Unjacketed Concentric Neutral Power Cables" Tyco Electronics, PII 55057, Rev AF, PCN 346641-000, Effective Date: Jul. 19, 2004 (5 pages).

* cited by examiner

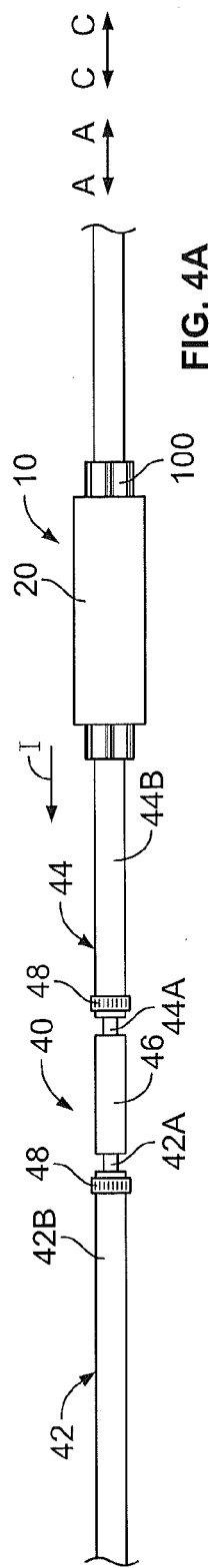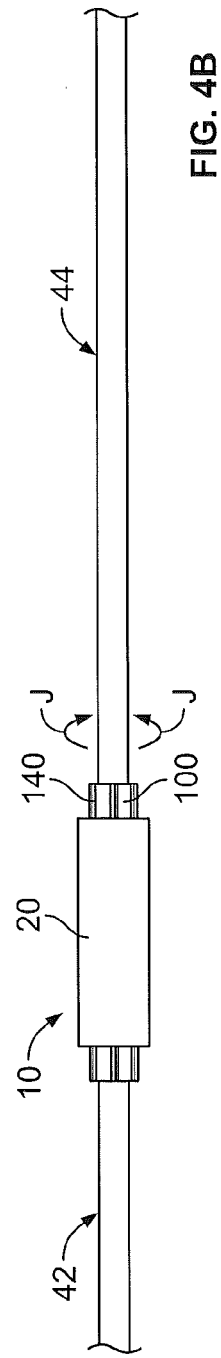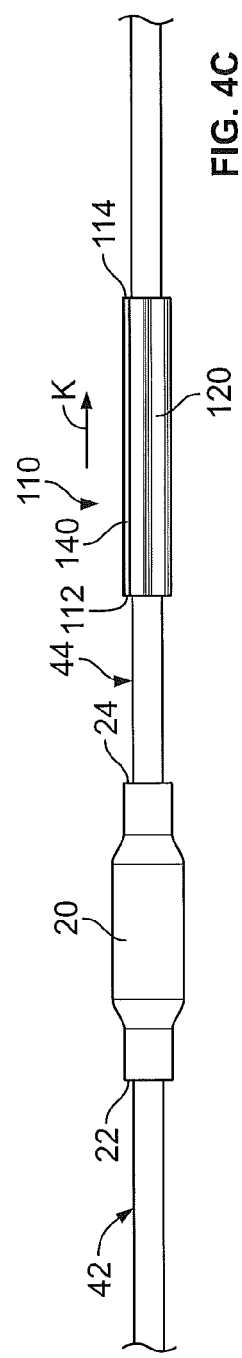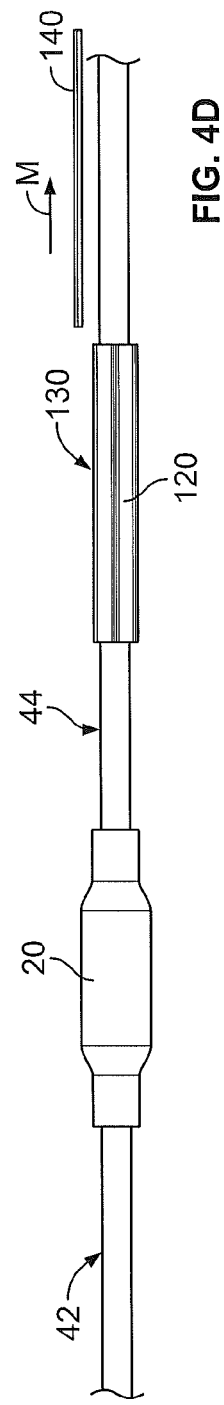
FIG. 4A
FIG. 4B
FIG. 4C
FIG. 4D

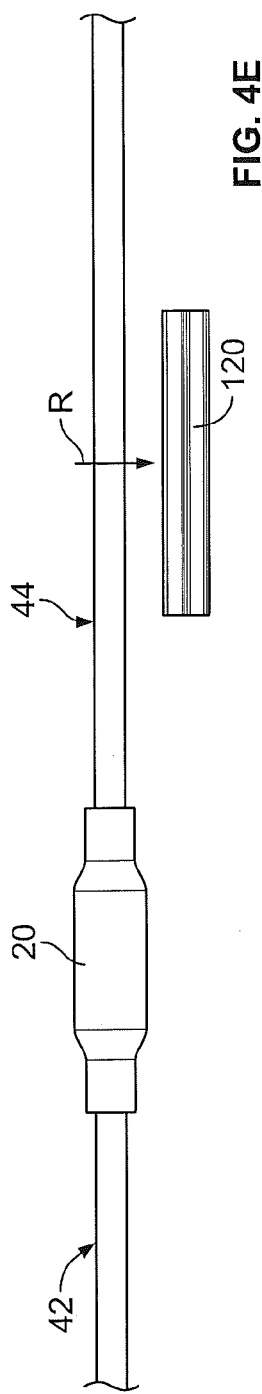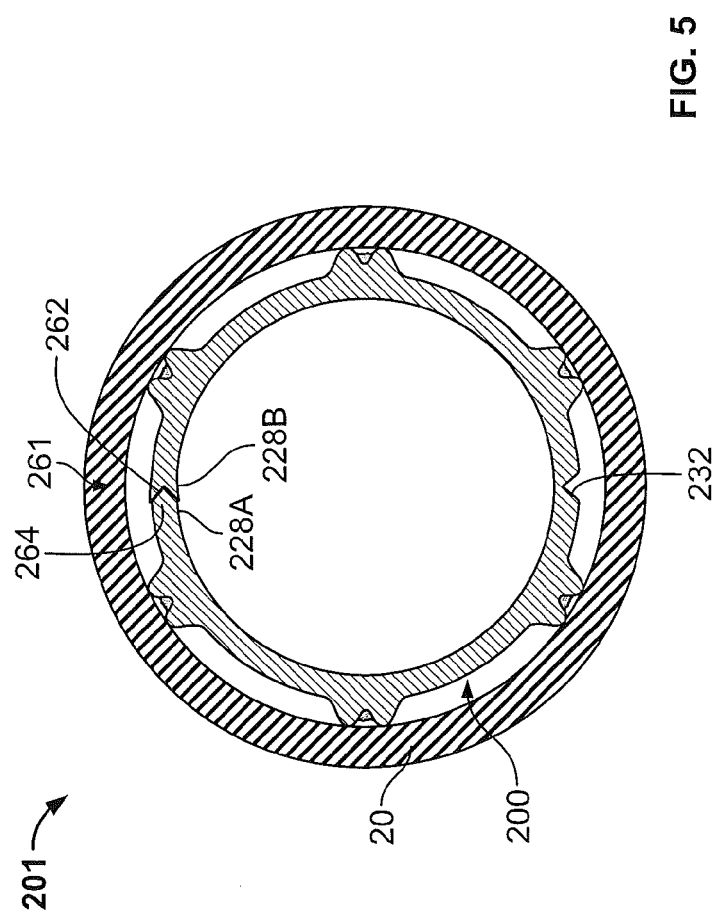

HOLDOUT DEVICES AND COVER ASSEMBLIES AND METHODS INCORPORATING THE SAME

FIELD OF THE INVENTION

The present invention relates to devices for applying a resilient sleeve onto an elongate substrate such as a cable and, more particularly, to holdout devices for applying a resilient sleeve onto an elongate substrate and cover assemblies and the methods incorporating holdout devices.

BACKGROUND OF THE INVENTION

Protective sleeves or covers are commonly installed on elongate substrates such as power distribution cables as well as other electrical cables. Such sleeves are commonly formed of an electrically insulative, polymeric material. Some known covers of this type are formed of a resilient, elastomeric material. In use, the sleeves are elastically stretched, placed about the substrate, and released, whereupon they recover to a reduced diameter to conform to or seal about the substrate. These sleeves may be referred to as cold-applied covers. It is generally necessary to expand the sleeve to a diameter sufficient to allow the sleeve to be slid onto the substrate. It is known to provide a holdout device or sleeve support in the sleeve to temporarily hold the sleeve in the expanded state. The holdout and the sleeve are slid over the substrate and the holdout is then removed to allow the sleeve to contract about the substrate. Known holdouts may suffer from various drawbacks.

SUMMARY OF THE INVENTION

According to embodiments of the present invention, a cover assembly for covering an elongate substrate includes a resilient, elastically expandable sleeve member and a holdout device. The sleeve member defines an axially extending inner sleeve passage. The holdout device includes a generally tubular core mounted in the inner sleeve passage. The core defines axially opposed end openings and a core passage extending therebetween to receive the elongate substrate. The core retains the sleeve member in a radially expanded state and can be withdrawn from the sleeve member to release the sleeve member to radially contract onto the elongate substrate. The holdout device is configured such that, after removal of the sleeve member from the core, the core can be laterally removed from the elongate substrate.

According to method embodiments of the present invention, a method for covering an elongate substrate includes providing a cover assembly including: a resilient, elastically expandable sleeve member defining an axially extending inner sleeve passage; and a holdout device including a generally tubular core mounted in the inner sleeve passage, the core defining axially opposed end openings and a core passage extending therebetween to receive the elongate substrate; wherein the core retains the sleeve member in a radially expanded state and can be withdrawn from the sleeve member to release the sleeve member to contract onto the elongate substrate. The method further includes: mounting the cover assembly on the elongate substrate such that the elongate substrate extends through the core passage; thereafter removing the core from the sleeve member to permit the sleeve member to radially contract about the elongate substrate; and thereafter laterally removing the core from the elongate substrate.

According to embodiments of the present invention, a holdout device for applying a resilient, elastically expandable sleeve member onto an elongate substrate, the sleeve member defining an axially extending inner sleeve passage, includes a generally tubular core configured to be mounted in the inner sleeve passage. The core defines axially opposed end openings and a core passage extending therebetween to receive the elongate substrate. The core retains the sleeve member in a radially expanded state and can be withdrawn from the sleeve member to release the sleeve member to radially contract onto the elongate substrate. The holdout device is configured such that, after removal of the sleeve member from the core, the core can be laterally removed from the elongate substrate.

Further features, advantages and details of the present invention will be appreciated by those of ordinary skill in the art from a reading of the figures and the detailed description of the embodiments that follow, such description being merely illustrative of the present invention.

BRIEF DESCRIPTION OF THE DRAWINGS

FIGS. 4A-4E are schematic side views illustrating methods for installing a sleeve member of the cover assembly of FIG. 1 on a substrate and removing a holdout device of the cover assembly from the substrate.

FIG. 5 is a cross-sectional view of a cover assembly according to further embodiments of the present invention.

DETAILED DESCRIPTION OF EMBODIMENTS OF THE INVENTION

Figure 1:
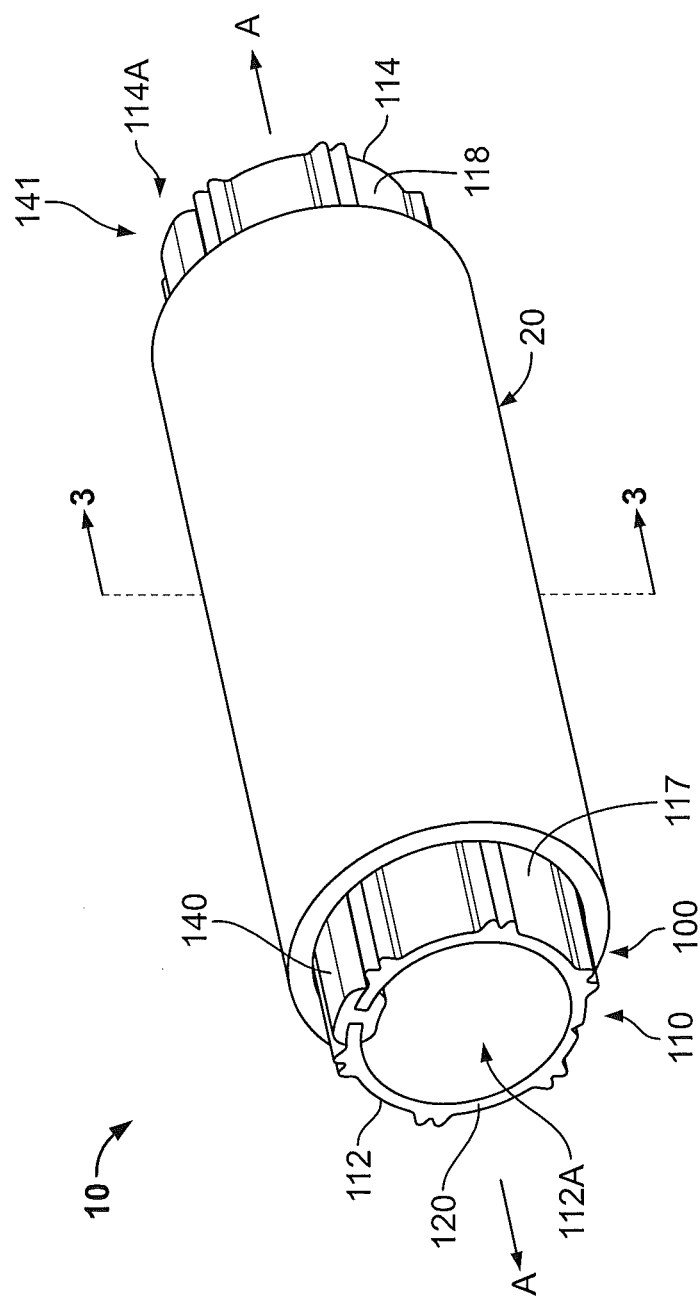
FIG. 1 is a perspective view of a cover assembly according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

With reference to FIGS. 1-4E, a cover assembly 10 according to embodiments of the present invention is shown therein. The cover assembly 10 includes a sleeve member 20 and a holdout device 100 that supports the sleeve member 20 in an expanded condition. The cover assembly 10 may be used to install the sleeve member 20 over an elongated substrate such as a cable splice 40 (FIG. 4A) or other cable assembly (e.g., a cable midsection or a cable termination) to protect the cable splice 40 or other substrate. As discussed in more detail below, the cover assembly 10 may be slid over the cable splice 40 and the holdout device 100 then removed to allow the sleeve member 20 to contract about the cable splice 40.

Turning to the sleeve member 20 in more detail, the sleeve member 20 may be referred to as a cold recoverable sleeve, a cold applied sleeve or cold shrinkable sleeve. Generally, the sleeve member 20 is a tubular structure that is formed of elastomeric-like material or has elastomeric physical recovery properties so that, when the sleeve member 20 is radially stretched to an expanded position by a restraint and thereafter released from the restraint, the sleeve member 20 will recover or return to a smaller radius (i.e., a recovered position). In practice, a further restraint (e.g., a substrate) may prevent the sleeve member 20 from fully recovering to a relaxed state, so that the sleeve member 20 continues to exert a radially compressive force on the substrate in the recovered position.

Figure 2:
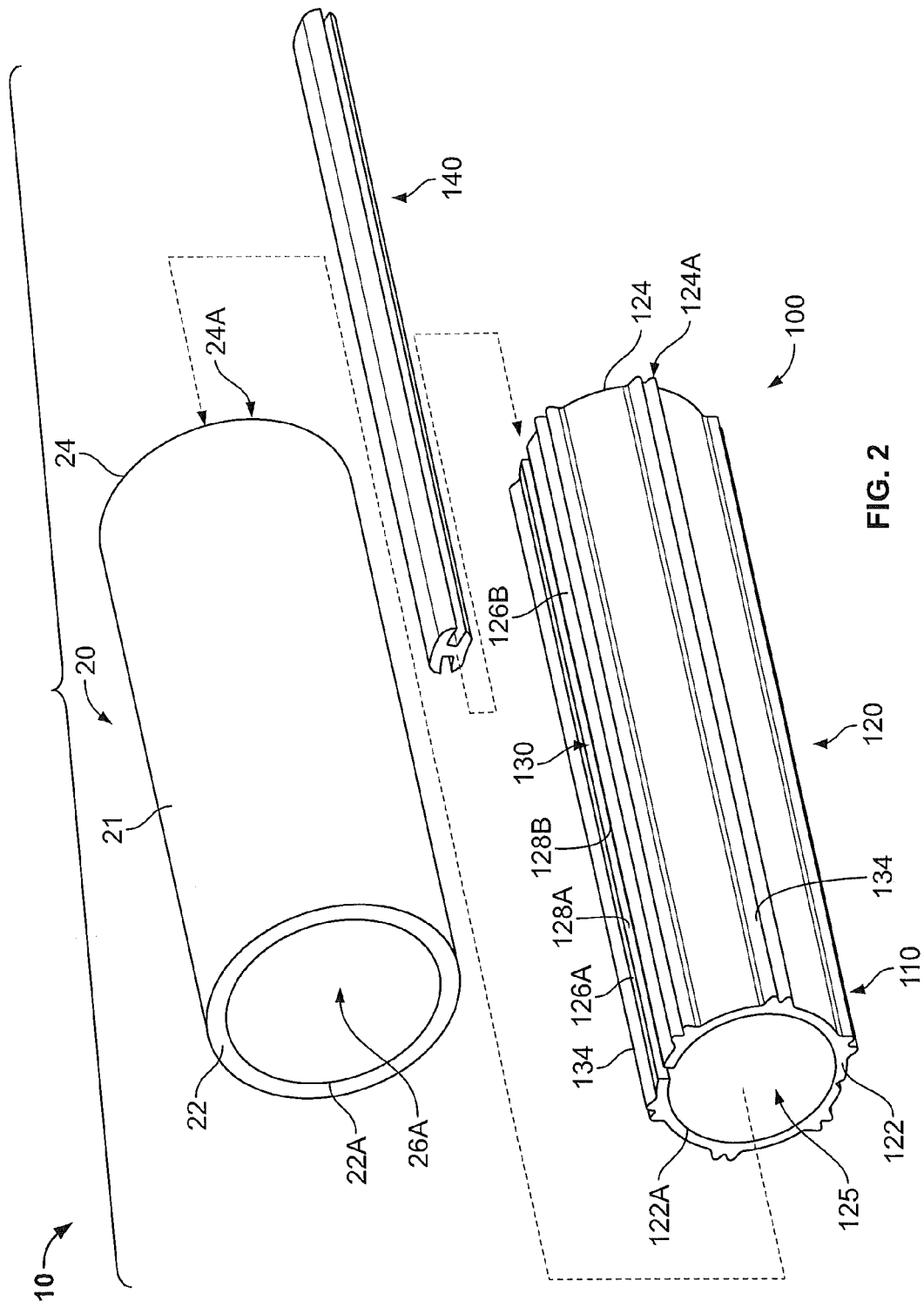
FIG. 2 is an exploded, perspective view of the cover assembly of FIG. 1.
Figure 3:
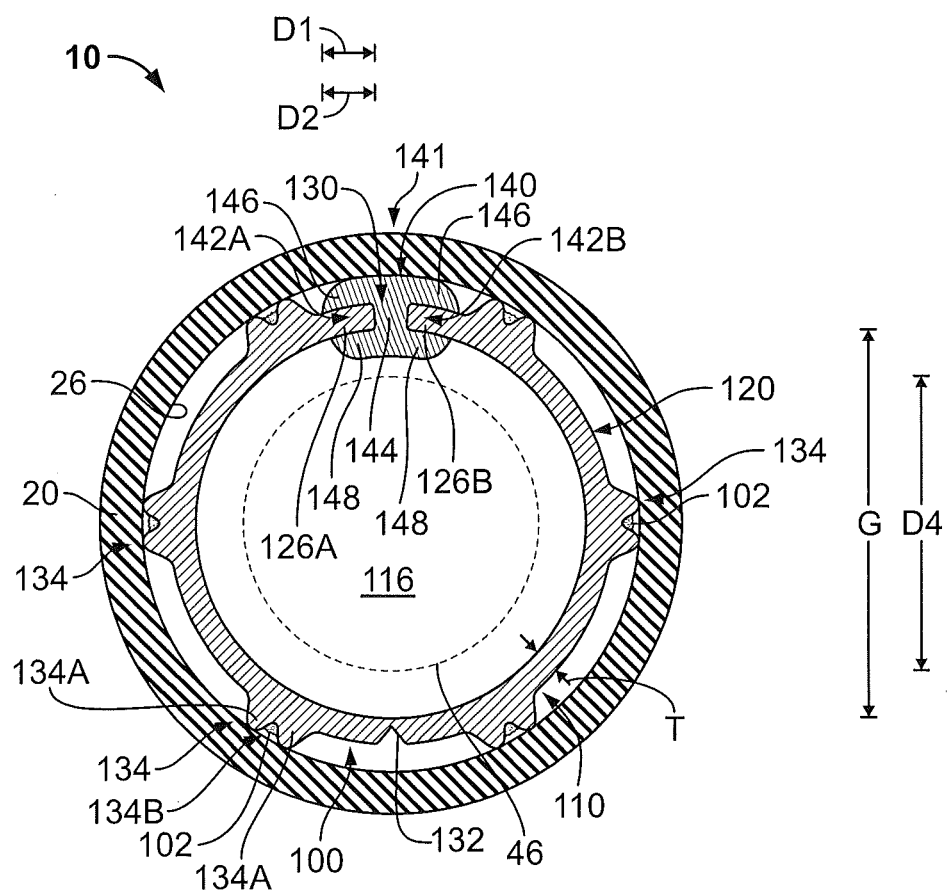
FIG. 3 is a cross-sectional view of the cover assembly of FIG. 1 taken along the line 3-3 of FIG. 1.

With reference to FIGS. 2 and 3, the sleeve member 20 includes a body 21 having opposed ends 22 and 24. An inner surface 26 (FIG. 3) of the sleeve member 20 defines an inner passage 26A (FIG. 3) communicating with opposed end openings 22A and 24A. In some embodiments (not shown), the sleeve member 20 may further include a plurality of integral sheds extending radially outwardly from the body 21.

At least a portion of the body 21, and according to some embodiments substantially the entire body 21 is formed of a resilient, radially elastic material. That is, the body 21 can be stretched radially and to an expanded (i.e., radially enlarged) condition as shown in FIGS. 1 and 4A and, upon release, will radially contract or recover to a partially or fully recovered condition having a smaller radius. The body 21 may be formed of any suitable material. According to some embodiments, the body 21 is formed of an elastomeric material. Suitable elastomeric materials include natural and synthetic polyisoprenes, polybutadiene, styrene-butadiene rubber (SBR), butadiene-acrylonitrile rubber, polychlorophrene (Neoprene), butyl rubber, polysulfide, silicone rubber, urethane rubber, polyacrylate, epichlorohydrin homo and copolymers, propylene oxide rubber, fluorosilicone rubber, fluorocarbon rubber, chlorosulfonated polyethylene, chlorinated polyethylene, ethylene-propylene rubber.

With reference to FIGS. 1-3, the holdout device 100 includes a core assembly or core 110. In some embodiments, the holdout device 100 further includes masses of lubricant 102 (e.g., a lubricating grease; FIG. 3) on the core 110.

The core 110 defines a longitudinal axis A-A and has first and second opposed ends 112, 114. The core 110 defines an inner passage 116 extending from the end 112 to the end 114 and communicating with end openings 112A and 114A (FIG. 2) also defined by the core 110. Opposed end sections 117, 118 (FIG. 1) extend axially outwardly beyond the ends 22, 24 of the sleeve member 20. According to some embodiments and as shown in FIG. 2, the core 110 is generally cylindrical in shape.

The core 110 includes a tubular body member 120 and a closure member, support member, insert, retainer or retention member 140 (hereinafter referred to as the retention member 140).

With reference to FIG. 2, the body member 120 is generally cylindrical in shape and has axially opposed ends 122 and 124. The body member 120 defines opposed end openings 122A, 124A and an axially extending interior passage 125 terminating at the end openings 122A, 124A. Opposed free edges 128A and 128B extend axially from end 122 to end 124. The free edges 128A, 128B define an axial slot 130 that intersects each of the end openings 122A, 124B. The side slot 130 extends continuously and completely from the end 122 to the end 124 and from the opening 122A to the opening 124A.

An axially extending preferential weakness line 132 (FIG. 3) is provided on a side of the body member 120 opposite the slot 130. The weakness line 132 may be a score line, living hinge, or the like.

Sets 134 of ribs 134A are provided on the outer surface of the body member 120 and spaced apart about the circumference of the body member 120. Each rib set 134 includes a pair of upstanding, radially outwardly projecting and axially extending ribs 134A defining a groove or trough 134B therebetween. Each trough 134B is open radially outwardly and extends axially the length of the body member 120. In some embodiments and as shown, the ribs 134A are substantially parallel to the axis A-A.

With reference to FIG. 3, the retention member 140 is generally H-shaped in cross-section. The retention member 140 includes a divider wall 144, opposed outer walls or flanges 146 and opposed inner walls or flanges 148. The wall 144 and flanges 146, 148 collectively define circumferentially or laterally opposed, axially extending receiver grooves or channels 142A and 142B.

When the core 110 is assembled, edge sections 126A and 126B of the body member 120 are received in the channels 142A and 142B, respectively, and the divider wall 144 is interposed between the edges 128A and 128B, as shown in FIG. 3. The retention member 140 and the cooperating edge sections 126A, 126B thereby serve as a releasable retention mechanism 141 as discussed below. The installed retention member 140 spans the axial side slot 130 so that the members 120, 140 collectively surround the passage 26A and the side slot 130 is closed. The retention member 140 can maintain the core 110 as a rigid structure.

The body member 120 and the retention member 140 may be formed of any suitable material(s). According to some embodiments, the body member 120 and the retention member 140 are formed of a polymeric material or materials. According to some embodiments, the body member 120 and the retention member 140 are formed of polypropylene, ABS, or PVC.

According to some embodiments, the body member 120 and the retention member 140 each have a flexural modulus in the range of from about 300,000 to 400,000 psi.

According to some embodiments, the core body member 120, in cross-section, defines an arc of between about 320 and 355 degrees when the holdout device 100 is in its closed position as shown in FIG. 3.

According to some embodiments, the nominal thickness T (FIG. 3) of the core body member 120 (not including the weakness line 132 or the slot 130) is in the range of from about 1 to 2 mm.

The body member 120 and the retention member 140 may each be formed by any suitable technique. According to some embodiments, the body member 120 and/or the retention member 140 are each extruded and cut to length. According to some embodiments, one or both of the members 120, 140 are molded (e.g., injection molded). In some embodiments, the body member 120 is a unitary, monolithic structure. In some embodiments, the retention member 140 is a unitary, monolithic structure.

According to some embodiments, the insertion depth D1 (FIG. 3) of each edge section 126A, 126B into its respective receiver channel 142A, 142B is in the range of from about 1 to 4 mm. According to some embodiments, the depth D2 (FIG. 3) of each receiver channel 142A, 142B is substantially the same as the depth D1 so that the edges 128A, 128B abut or nearly abut the divider wall 144.

The lubricant 102 is contained in some or all of the troughs 134B. The lubricant 102 may be provided as strips or beads of the lubricant 102 extending fully or partially down the length of each trough 134B. The lubricant 134B may fully or partially fill each trough 134B. Suitable lubricants may include silicone or fluorosilicone grease. The lubricant 102 can be installed in the troughs 134B before or after inserting the retention member 140 in the slot 130.

The cover assembly 10 can be formed by any suitable method. According to some embodiments, the core 110 is assembled by inserting the retention member 140 into the slot 130 as shown in FIG. 3. According to some embodiments, the retention member 140 is slid axially into the slot 130 such that the edge sections 126A, 126B slide within the channels 142A, 142B.

The core 110 is mounted in the inner passage 26A of the sleeve member 20 such that the sleeve member 20 is in a radially expanded condition or state as compared to its relaxed state and its intended installed state. For example, the core 110 can be installed in the sleeve member 20 by expanding the sleeve member 20, then inserting the core 110 in the passage 26A, and thereafter releasing the sleeve member 20 to contract onto the core 110. It will be appreciated that the elastically expanded sleeve member 20 applies a persistent radially compressive load on the holdout device 100, and the holdout device 100 resists radial collapse of the core 110 due to this load. The holdout device 100 thereby serves as a supporting structure that resists radial contraction of the sleeve member 20. The cover assembly 10 may be stored, transported, etc. in this condition.

The cable splice 40 (FIG. 4A) is merely exemplary and includes a pair of cables 42, 44 and an electrically conductive connector 46. The cables 42, 44 each have an electrical conductor 42A, 44A surrounded by an electrically insulating jacket 42B, 44B. The conductors 42A, 44B are terminated at the connector 46 and mechanically and electrically coupled thereby. It may be desirable or necessary to apply an environmental protection cover such as the sleeve member 20 over the connector 46 and the adjacent portions of the cables 42, 44. In some embodiments, strips of mastic 48 or other sealant or gasket material may be provided about the cables 42, 44 to provide an enhanced seal between the sleeve member 20 and the cables 42, 44.

To install the sleeve member 20 on the cable splice 40, the installer first slides the cover assembly 10 over the cable 44 as shown in FIG. 4A. The cable 46 is received in the inner passage 116. In the supporting position as shown in FIGS. 1-4, the nominal inner diameter G (FIG. 3) of the core 110 is sized to allow the core 110 to be slid over the cable 44 without undue effort or damage to the cable 44. The cover assembly 10 can be slid onto the cable 44 from either direction or with either end leading.

The splice 40 is then formed by securing the ends of the cables 42, 44 to the connector 46, shown in FIG. 4A. The cover assembly 10 is then slid in a direction I to position the cover assembly 10 over the splice 40 shown in FIG. 4B. According to some embodiments, the inner diameter G of the core 110 is sized to allow the core 110 to be slid over the cable splice 40 without undue effort or damage to the cable splice 40 (e.g., damage to the cables 42, 44, the connector 46 or the engagement therebetween). The profile of the connector 46 is shown in dashed lines in FIG. 3 for reference.

The installer may grasp the holdout device 100 and sleeve member 20 and circumferentially twist (i.e., in directions J) one or both relative to the other. In doing so, the installer may loosen the surface to surface engagement between the core 110 and the sleeve member 20 and may distribute the lubricant 102 between the engaged surfaces.

The installer then holds the sleeve member 20 in place while axially pulling and withdrawing the core 110 in a withdrawal direction K (FIG. 4C) from the sleeve member 20.

As the core 110 is withdrawn, the front end 112 is axially retracted relative to the sleeve member 20. As a result, sleeve member 20 is no longer supported in the expanded condition by the core 110 and is permitted to progressively partially or fully recover to a radially recovered condition or position with a reduced diameter. The sleeve section 30 contracts about and conforms to the cables 42, 44 and the connector 46. The user continues to pull out the holdout assembly 100 until the end 114 is free of the sleeve member 20, allowing the sleeve member 20 to attain a suitably radially recovered position from the end 22 to the end 24 as shown in FIG. 4C.

The installed sleeve member 20 may form a seal with the cables 42, 44 and the connector 46. In some embodiments, the sleeve member 20 is configured so that, when installed on the splice 40, the recovered sleeve member 20 remains in a partially expanded position (as compared to its relaxed state) so that the sleeve member 20 continues to apply a persistent radially compressive load to the splice 40.

With the core 110 now free of the sleeve member 20, the installer can remove the retention member 140 from the slot 130 and the body member 120. In some embodiments, the installer pulls the retention member 140 to slide the retention member 140 axially out (e.g., in a removal direction M) from the slot 130 as shown in FIG. 4D. In this manner, the side slot 130 is opened to place the core 110 in an open position.

With the retention member 140 removed, the installer slides the cable 44 through the side slot 130 to remove the body member 120 from the cable 44. The body member 120 can be moved or displaced transversely or laterally relative to the axis A-A and the cable axis C-C (FIG. 4A) (e.g., in a transverse or lateral direction R) as shown in FIG. 4E. If desired, the installer can widen the side opening 130 by splitting, breaking, laterally bending or circumferentially expanding the body member 120. More particularly, the installer may bend or break the body member 120 about the weakness line 132 to further open the side slot 130.

The removed body member 120 and retention member 140 can then be discarded or otherwise disposed of.

According to some embodiments, the sleeve member 20 as mounted on the holdout device 100 in the undeployed cover assembly 10 is expanded at least about 200% of its relaxed diameter. According to some embodiments, the sleeve member 20 is expanded between about 200 and 350% as compared to a relaxed diameter. According to some embodiments, when the core 110 is in the supporting position, the core 110 has a nominal inner diameter of between about 30 and 150 mm.

According to some embodiments, the required clearance or tolerance between the maximum diameter D4 (FIG. 3) of the splice 40 (i.e., the portion of the substrate over which the holdout device 100 is positioned) and the minimum inner diameter G of the passage 26A is less than 5 mm and, in some embodiments, less than 3 mm.

According to further embodiments, the end 22 of the sleeve 20 may be closed to form a cap. In such case, the holdout device 100 would not extend past the sleeve end 22.

Figure 6:
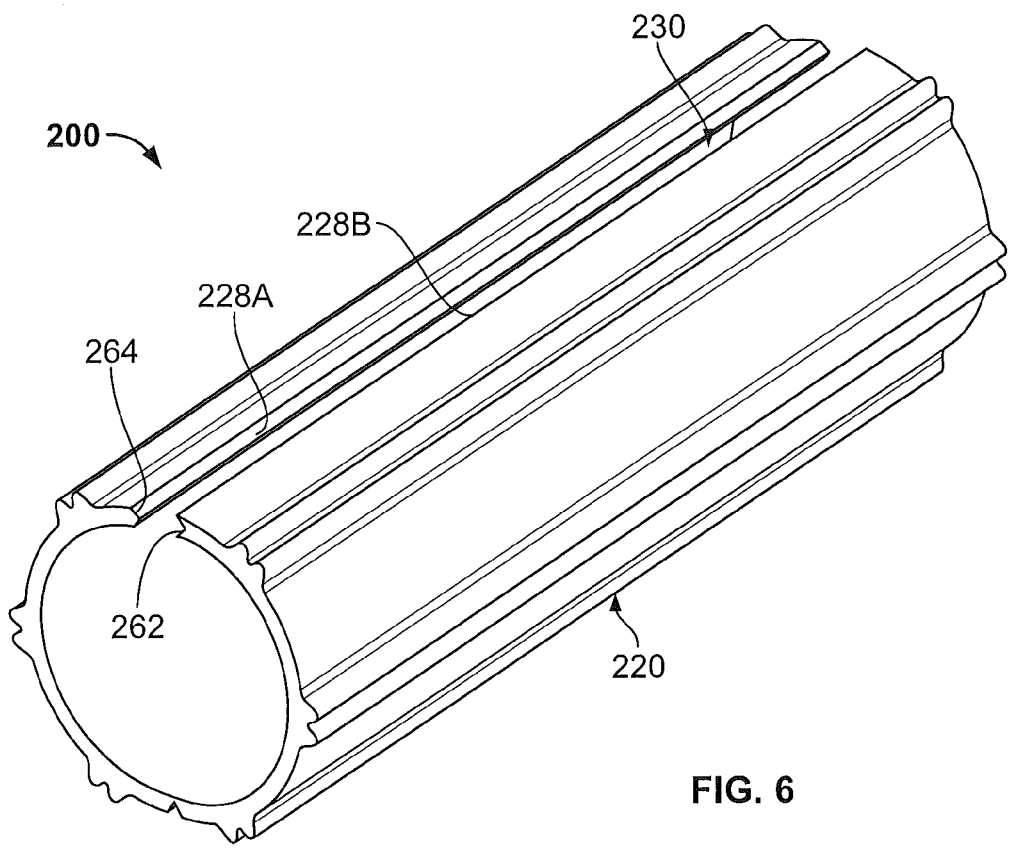
FIG. 6 is a perspective view of a holdout device forming a part of the cover assembly of FIG. 5.

With reference to FIGS. 5 and 6, a cover assembly 201 including the sleeve member 20 and a holdout device 200 according to further embodiments of the present invention is shown therein. The cover assembly 201 may be used in place of the cover assembly 10. The cover assembly 201 and the holdout device 200 may be formed in the same manner as the cover assembly 10 and holdout device 100 except as follows.

The holdout device 200 includes tubular body member 220 generally corresponding to the body member 120. However, in the holdout device 200, the retention member 140 is replaced with a releasable retention mechanism 261 including cooperating retention or interlock features 262 and 264 located on the free edges 228A and 228B, respectively. In the supporting position as shown in FIG. 5, the interlock features 262, 264 prevent the tubular body member 220 from collapsing radially inwardly under the load of the sleeve member 20. After the body member 220 is withdrawn from the sleeve member 20 as described above with reference to FIG. 4C, the installer can bend or break the body member 220 (e.g., about the weakness line 232) to separate the edges 228A and 228B and open a side slot 230 (FIG. 6), placing the body member 220 in an open position to permit passage of the cable and lateral removal of the cover member 220 from the cable. The holdout device 200 is shown in its open position in FIG. 6. In the illustrated embodiment, the edges 228A, 228B that define the slot 230 directly engage one another when the holdout device 200 is in its closed position.

Figure 7:
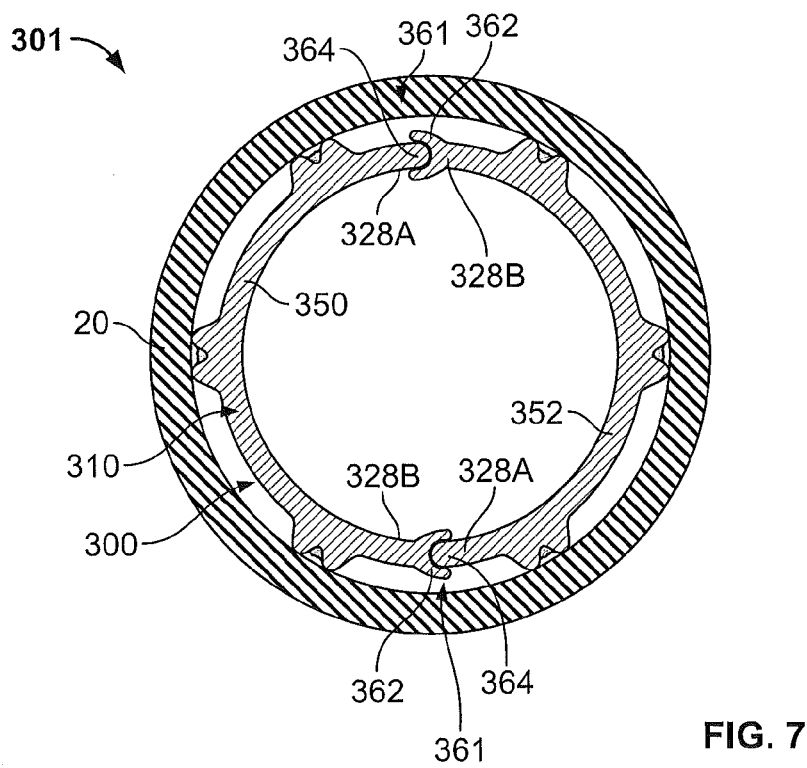
FIG. 7 is a cross-sectional view of a cover assembly according to further embodiments of the present invention.

With reference to FIG. 7, a cover assembly 301 including the sleeve member and a holdout device 300 according to further embodiments of the present invention is shown therein. The cover assembly 301 may be used in place of the cover assembly 10. The cover assembly 301 and holdout device 300 may be formed in the same manner as the cover assembly 201 and the holdout device 200, except as follows.

The holdout device 300 includes a core 310 including two semi-cylindrical core body section members 350 and 352. The core body section members 350, 352 each have cooperating retention or interlock structures 362 and 364. More particularly, each of the body section members 350, 352 has axially extending, laterally opposed side edges 328A, 328B, an axially extending, U-shaped interlock channel 362 (i.e., an interlock structure of a first type) on the side edge 328B, and an axially extending, U-shaped interlock insert portion 364 (i.e., an interlock structure of a second type) on the side edge 328A. When the holdout device 300 is assembled in a supporting position, as shown in FIG. 7, the insert portion 364 of the body section member 350 is nested or received in the channel 362 of the body section member 352 and the insert portion 364 of the body section member 352 is nested or received in the channel 362 of the body section member 350 to provide two releasable retention mechanisms 361. This hermaphroditic interlock feature configuration permits assembly of the core 310 from two identical body section members.

The body section members 350, 352 thereby collectively form a tubular member (i.e., the core 310) that resists the radial compression load of the sleeve member 20. The cover assembly 301 can be used to install the sleeve member 20 on a splice or the like in the same manner as described above. However, in the case of the cover assembly 301, once the core 310 has been withdrawn from the sleeve member 20, the body section members 350, 352 can be broken apart at the junctions between the interlock features 362, 364 to open the core 310 and permit the installer to laterally remove the core 310 from the cable.

Figure 8:
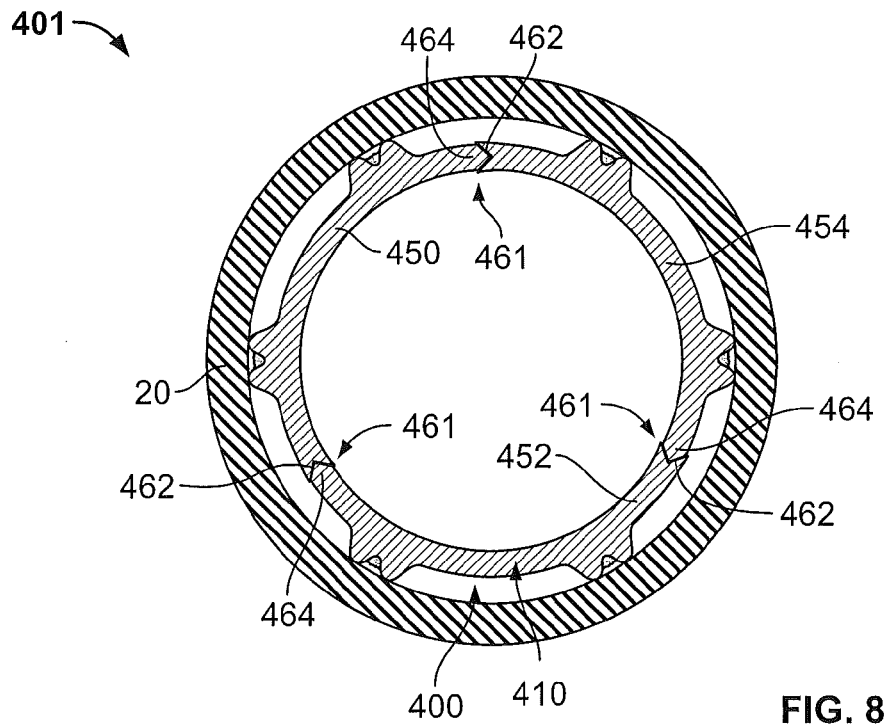
FIG. 8 is a cross-sectional view of a cover assembly according to further embodiments of the present invention.

With reference to FIG. 8, a cover assembly 401 including the sleeve member 20 and a holdout device 400 according to further embodiments of the present invention is shown therein. The cover assembly 401 may be used in place of the cover assembly 10. The cover assembly 401 and holdout device 400 may be formed and used in the same manner as the cover assembly 301 and the holdout device 300, except as follows. The holdout device 400 includes a core 410 comprising three discrete body section members 450, 452, 454. Each of the body section members 450, 452, 454 has opposed retention or interlock structures of first and second types (an axially extending, V-shaped interlock channel 462 and an axially extending, V-shaped insert portion 464) to provide three releasable retention mechanisms 461. The body section members 450, 452, 454 can thus be assembled and disassembled in a similar manner to that described above with regard to the body section members 350, 352. While three body section members 450, 452, 454 are shown, holdout devices in accordance with embodiments of the invention may also include four or more interlocked body section members. The provision of multiple body section members can facilitate the construction of larger diameter holdout devices.

Figure 9:
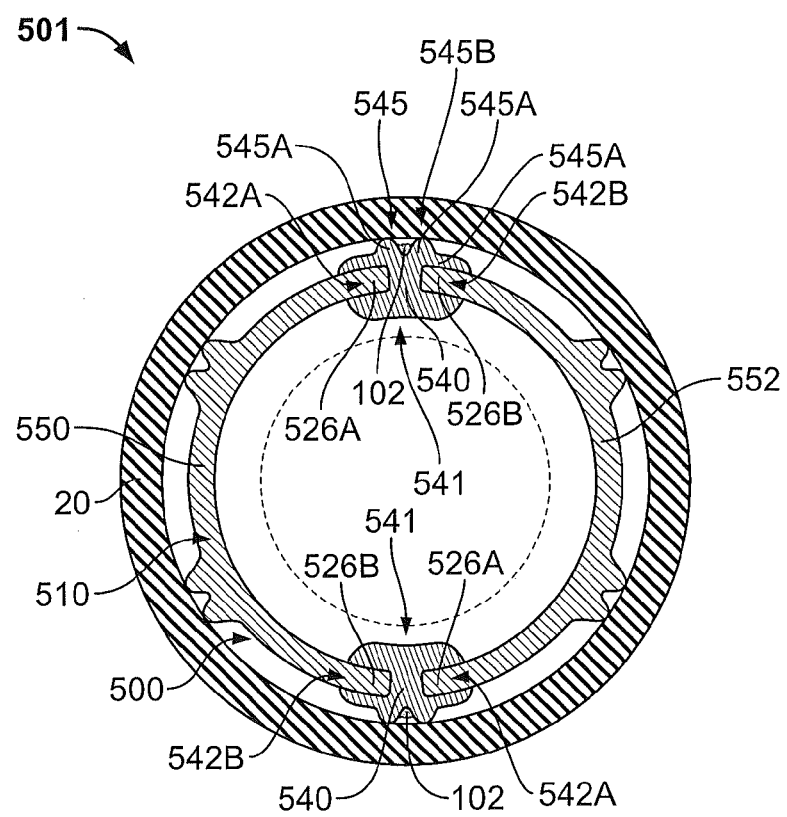
FIG. 9 is a cross-sectional view of a cover assembly according to further embodiments of the present invention.

With reference to FIG. 9, a cover assembly 501 including the sleeve member and a holdout device 500 according to further embodiments of the present invention is shown therein. The cover assembly 501 may be used in place of the cover assembly 10. The holdout device 500 is shown in FIG. 9 in its supporting position. The cover assembly 501 and holdout device 500 may be formed in the same manner as the cover assembly 301 and the holdout device 300, except as follows.

The holdout device 500 includes a core 510 including two body section members 550, 552 generally corresponding to the body section members 350, 352 except that the lateral opposed edges of the body sections 550, 552 are not provided with interlock channels. Instead, the core 510 includes a pair of retention members 540 corresponding to the retention member 140. Opposed edge portions 526A and 526B of each body section 550, 552 are received in channels 542A and 542B of each retention member 540 to provide a pair of releasable retention mechanisms 541 that couple the body sections 550, 552 in a tubular configuration.

The cover assembly 501 can be used in the same manner as described above with regard to the cover assembly 10 to install the sleeve member 20 and to withdraw the holdout device 500. The core 510 can be removed from the cable or other substrate by slide out one or more of the retention members 540 and the body sections 550, 552 to provide a side slot for passage of the substrate or to substantially disassemble the core 510.

Optionally and as shown, the retention members 540 each include an integral set 545 of ribs 545A defining a trough 545B, which may contain the lubricant 102. For example, the ribs 545A can be integrally molded or extruded on the retention members 540. This feature may likewise be incorporated into the retention member 140, for example. In this case, the rib sets 134 may be redistributed about the circumference of the body member 120 so that the rib sets 134 and the rib set of the retention member 140 are equidistantly distributed.

The cover assemblies and holdout devices of the present invention may provide a number of advantages. After the sleeve member has been installed, the holdout device can be easily removed from the substrate even when an opening or terminal end of the substrate is not available or conveniently accessible to slide the holdout device off of the substrate.

Because it is not necessary to pull a rip cord or the like through the interior passage of the holdout device between the holdout device and the substrate, holdout devices of the present invention may be used with a wider range of substrate diameters. The risk of disturbing mastics or the like on the substrate with such a rip cord are eliminated, so that it is not necessary to apply mastic after removing the holdout device and/or to tape over such mastic, as may be the case with a helically wound holdout.

The cover assemblies provide an effective mechanism for applying a cold-applied or cold shrinkable cover onto an elongate substrate such as a cable, cable splice or cable termination. The holdout devices may provide improved reliability and convenience as compared to other holdout devices.

Various modifications may be made to the embodiments discussed above in accordance with the present invention. For example, the retention member 140 may be substantially permanently secured (e.g., glued or welded) to one of the edge sections 126A, 126B, in which case the core 110 could be removed from the substrate in the manner described with respect to the holdout device 200.

While V-shaped, U-shaped, and rectangular interlock channels and insert portions 264, 364, 464 are illustrated herein in particular embodiments, these shapes may be employed in any of the embodiments and various other shapes may be used.

Body members (e.g., the body members 120, 220) and body sections (e.g., the body sections 350, 352, 450, 452, 454, 550, 552) may be formed by extruding tubular or semi-tubular members and cutting to the desired length. Alternatively, these components may be formed by forming sheets (e.g., by extrusion, cutting to desired width and/or length if needed, and rolling the sheets into the shape of the component. For example, the core 110 can be formed by extruding and cutting a sheet, rolling the sheet to form the body member 120, and installing the retention member 140 on the edges 126A, 126B. Likewise, a sheet may be extruded and rolled to form the tubular body member 220, for example. This method of forming may permit the manufacture of holdout devices having a wide range of diameters without requiring a different extrusion die for each size.

According to some embodiments, the core (e.g., the core 110, 210, 310, 410 or 510) is assembled inside the sleeve member 20 instead of being assembled and thereafter inserted into an expanded sleeve member 20. More particularly, the core components can be inserted into the passage 26A with the sleeve member non-expanded (or not yet expanded to the full extent of expansion in the ultimate cover assembly), and then expanded along with the sleeve member 20 and locked in its tubular, supporting configuration. Moreover, the core component(s) (e.g., the body member 220 or the body sections 350, 352) may be designed such that they will automatically lock into place (i.e., the interlock features 262, 264 will mate) when the sleeve member 20 reaches the desired expansion. These methods can allow easier expansion of the sleeve member 20, removal of the cover assembly from the expander, and faster cycle time and part throughput.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A cover assembly for covering an elongate substrate, the cover assembly comprising:
    a resilient, elastically expandable sleeve member defining an axially extending inner sleeve passage; and
    a holdout device including a generally tubular core mounted in the inner sleeve passage, the core defining axially opposed end openings and a core passage extending therebetween to receive the elongate substrate, wherein the core includes a core body member including opposed edge sections defining an axially extending side slot intersecting the core passage and the end openings;
    a retention mechanism configured to releasably close and/or cover the side slot, the retention mechanism including a retention member mounted in the side slot and releasably engaged with the opposed edge sections and removable from the side slot to open the side slot;
    wherein the core retains the sleeve member in a radially expanded state and can be withdrawn from the sleeve member to release the sleeve member to radially contract onto the elongate substrate;
    wherein the holdout device is configured such that, after removal of the sleeve member from the core and removal of the retention member from the side slot, the core can be laterally removed from the elongate substrate by passing the elongate substrate through the side slot; and wherein the retention member includes an integral trough and a mass of lubricant disposed in the trough to lubricate an interface between the retention member and the sleeve member.

2. The cover assembly of claim 1 wherein an end section of the core extends axially beyond an end of the sleeve member.

3. The cover assembly of claim 1 wherein the retention member includes at least one integral, upstanding rib engaging an inner surface of the sleeve member.

4. The cover assembly of claim 1 wherein the retention member is slidably mounted on the opposed edge sections to permit removal from the core by axially withdrawing the retention member from the side slot.

5. The cover assembly of claim 1 wherein:

the core body is a unitary core body member and the first and second opposed edge sections are integral with the unitary core body; and the retention mechanism includes cooperating first and second integral retention features forming parts of the first and second opposed edge sections, respectively.

6. The cover assembly of claim 1 wherein the core is rigid.

7. The cover assembly of claim 1 wherein the core includes an integral weakness line to facilitate bending and/or breaking of the core about an axially extending bend line.

8. A cover assembly for covering an elongate substrate, the cover assembly comprising:

a resilient, elastically expandable sleeve member defining an axially extending inner sleeve passage; and a holdout device including a generally tubular core mounted in the inner sleeve passage, the core defining axially opposed end openings and a core passage extending therebetween to receive the elongate substrate, wherein the core includes a core body member including opposed edge sections defining an axially extending side slot intersecting the core passage and the end openings;

a retention mechanism configured to releasably close and/or cover the side slot, the retention mechanism including a retention member mounted in the side slot and releasably engaged with the opposed edge sections and removable from the side slot to open the side slot;

wherein the core retains the sleeve member in a radially expanded state and can be withdrawn from the sleeve member to release the sleeve member to radially contract onto the elongate substrate;

wherein the holdout device is configured such that, after removal of the sleeve member from the core and removal of the retention member from the side slot, the core can be laterally removed from the elongate substrate by passing the elongate substrate through the side slot;

wherein an end section of the core extends axially beyond an end of the sleeve member; and wherein the retention member includes at least one integral, upstanding rib engaging an inner surface of the sleeve member.

9. A cover assembly for covering an elongate substrate, the cover assembly comprising:

a resilient, elastically expandable sleeve member defining an axially extending inner sleeve passage; and a holdout device including a generally tubular core mounted in the inner sleeve passage, the core defining axially opposed end openings and a core passage extending therebetween to receive the elongate substrate;

wherein the core retains the sleeve member in a radially expanded state and can be withdrawn from the sleeve member to release the sleeve member to radially contract onto the elongate substrate;

wherein the holdout device is configured such that, after removal of the sleeve member from the core, the core can be laterally removed from the elongate substrate;

wherein an end section of the core extends axially beyond an end of the sleeve member; and wherein the core includes an integral weakness line to facilitate bending and/or breaking of the core about an axially extending bend line.

\* \* \* \* \*